United States Patent

[11] 3,571,714

[72] Inventor Karl Traub
Fuerth, Germany
[21] Appl. No. 759,369
[22] Filed Sept. 12, 1968
[45] Patented Mar. 23, 1971
[73] Assignee Grundig E.M.V. Elektro-Mechanische Versuchsanstalt, inh. Max Grundig
Fuerth, (Bayern), Germany

[54] LAMP ARRANGEMENT FOR COMBINED TUNING INDICATION AND SILENT TUNING IN HIGH-FREQUENCY RECEIVERS

10 Claims, 1 Drawing Fig.

[52] U.S. Cl. ........ 325/364, 325/403, 325/455, 325/456, 330/59, 334/36
[51] Int. Cl. ........ H04b 1/00
H03f 17/00, H03i 1/04
[50] Field of Search ........ 325/348, 363, 364, 402, 403, 455, 456, 457 (Inquired); 330/59; 334/36, 86, (Inquired)

[56] References Cited

UNITED STATES PATENTS

| | | | |
|---|---|---|---|
| 2,159,240 | 5/1939 | Wheeler | 325/455 |
| 2,182,678 | 12/1939 | Root | 325/456 |
| 2,447,309 | 8/1948 | Blaisdell | 325/455 |
| 2,819,400 | 1/1958 | Toth | 325/455 |
| 3,281,706 | 10/1966 | Morris et al. | 330/59 |
| 3,379,991 | 4/1968 | Clerc et al. | 330/59 |

*Primary Examiner*—Robert L. Griffin
*Assistant Examiner*—James A. Brodsky
*Attorney*—Michael S. Striker

ABSTRACT: Three sets of lamps are used for indicating the tuning conditions by being interconnected at the outputs of two threshold switching circuits. The inputs to the threshold circuits are, in turn, connected to DC voltages of opposite polarity provided by a symmetrical ratio detector or discriminator. Each threshold circuit has a complementary transistor, and the output of the circuit has a pair of lamps connected in parallel, as the output impedance of the circuit. A third single lamp is connected between the two sets of parallel-connected lamps. When the single lamp is turned on the parallel-connected lamps are turned off and vice versa. An indicator board with three viewing areas is associated with the lamps.

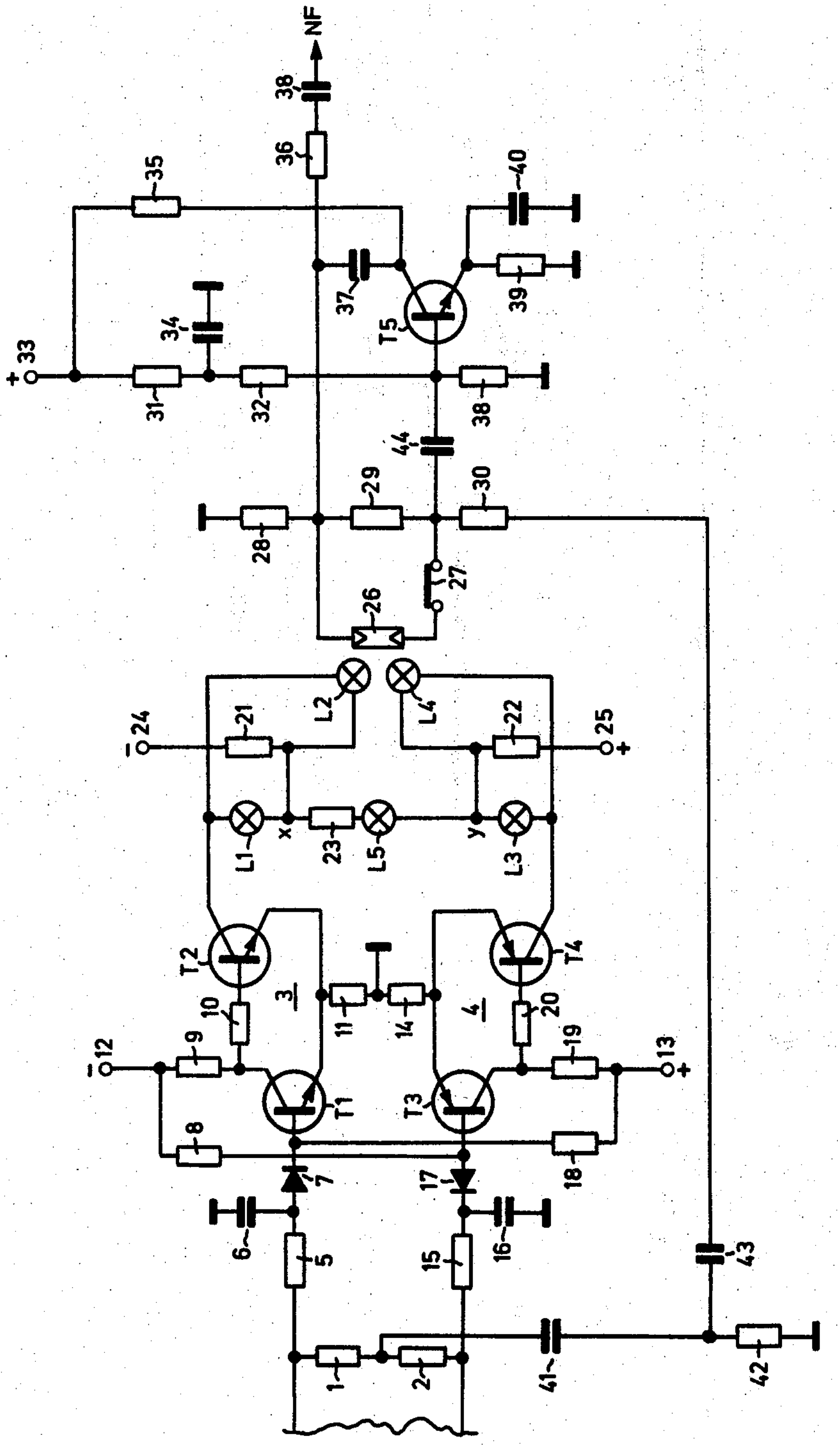
BY
INVENTOR.
KARL TRAUB
By: Michael S. Striker
Attorney

LAMP ARRANGEMENT FOR COMBINED TUNING INDICATION AND SILENT TUNING IN HIGH-FREQUENCY RECEIVERS

BACKGROUND OF THE INVENTION

The present invention resides in an arrangement in which a tuning indicator and silent tuning is combined in a high-frequency receiver with two complementary threshold circuits. These threshold circuits are controlled from two direct voltages of opposite polarity derived from a symmetrical ratio detector or discriminator.

Arrangements for tuning indications by means of tuning indicator tubes are well known in the art. Such arrangements may be found in the German Pat. Nos. 1,033,267; 1,059,053; 1,201,427; 1,194,011; 1,103,995; and 1,046,692. In these arrangements, in the known art, the receiving apparatus may be set to the center of the carrier. However, it is not possible to determine from the illuminating arrangement, which of the two sidebands of the apparatus are set, under inaccurate tuning conditions. It is also possible to determine from the intensity of the illuminated surface whether the transmitter has a large or a small field strength. However, in the known arrangements, there is no borderline between the field strengths of transmitters which are worthy and not worthy of reception.

It is a particular object of the present invention to indicate to operating personnel, if no signal appears at the input of the apparatus or a signal which is not worthy of reception. It is also the object of the present invention to indicate to the operating personnel whether a receptive signal is precisely at the center of the carrier or whether it is tuned to the left or right sideband. At the same time, it is the object of the present invention to combine with this tuning indication an arrangement which becomes operative only when a receptive transmitter is tuned to the center of the carrier. This is to be attained through attenuated amplification of the apparatus.

The object of the present invention is achieved through two threshold circuits having complementary transistors. The inputs of these two threshold circuits are coupled to the DC voltages of opposite polarity from a symmetrical ratio detector or discriminator. The output resistors of the threshold circuits are formed through the series circuit of two parallel-connected incandescent lamps each having ohmic resistance. The junction points between the incandescent lamps are bridged by the series circuit of a further incandescent lamp and a resistor. This series circuit provides a resistance between the respective junction circuit points. The resistors are selected so that the incandescent lamps connected in parallel, light when the associated end or terminal stage is turned on. This implies the condition in which the threshold value is below the input voltage for turning on the threshold circuit. Under these circumstances, the single incandescent lamp does not light. When the end or terminal stages are turned off, the single incandescent lamp, on the other hand, lights. Under these conditions the threshold value of the input voltage is exceeded and the parallel-connected incandescent lamps are turned off.

SUMMARY OF THE INVENTION

An arrangement which combines tuning indication with silent tuning in high frequency receivers. Two threshold switching circuits have their inputs connected to DC voltages of opposite polarity provided by a symmetrical ratio detector or discriminator. These voltages are applied to the bases of complementary transistors within the threshold circuits. The outputs of the threshold circuits are connected to indicating lamps which when connected in series with a resistor, form the output impedance of the threshold circuits. Two parallel-connected lamps and a resistor in series with the parallel combination establishes the output impedance of the respective threshold switching circuit. A third lamp connected in series with a resistor is in a circuit between the two sets of parallel-connected lamps. The arrangement is such that when the single lamp is on, the parallel connected lamps at the outputs of the threshold circuits are turned off. Conversely, when the single lamp is turned off the parallel connected lamps are turned on. The parallel connected lamps are controlled by the voltage level of the signal applied to the bases of the complementary transistors in the threshold switching circuits. When the applied DC voltages to the inputs of the threshold switching circuits are below the threshold levels set for these circuits, the lamps at the outputs of the threshold circuits are turned on. At the same time, when the DC voltages are above the predetermined or set threshold levels the parallel-connected lamps are turned off. A photosensitive resistor controlled by the lamps at the outputs of the threshold circuits exercises control over the amplification of the low-frequency signal in a silent tuning circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

An electrical schematic diagram showing the electrical and electronic components as well as their interconnections for achieving the objects of the present invention.

DESCRIPTION OF THE PREFERRED EMBODIMENTS

Referring to the drawing, DC voltages of opposite polarity appear at the resistors 1 and 2 through the commonly known operation of a symmetrical ratio detector. The absolute magnitudes of these voltages in relation to ground are equal and of opposite polarity without the presence of an antenna signal through the noise voltage reaching the diodes. The same relationship between these voltages applies with an antenna signal upon precise tuning or balancing of the field strengths. As a result of the ±90° phase relationship between the voltage at the tertiary coil and the two divided voltages at the secondary circuit, the absolute magnitudes of the two DC voltages in relation to ground, begin to vary with the least amount of detuning. Thus, with detuning to one side, one portion of the DC voltage decreases while the other portion increases. With further increase in the detuning, the increased voltage then decreases again in accordance with the IF transmission curve. When detuning occurs in the opposite direction, the variation in the magnitudes of the DC voltages occurs in the opposite sense.

The DC voltages which are of opposite polarity and are both dependent upon field strength and tuning, are used to control two threshold circuits 3 and 4. The threshold circuit 3 is used to process the positive DC voltage with NPN transistors $T_1$ and $T_2$. The negative DC voltage on the other hand, is processed with PNP transistors $T_3$ and $T_4$. All remaining electrical component values are indentical in the two threshold circuits. The power supply for the two stages is provided by the voltage sources 12 and 13 of opposite polarity. These voltage sources are stabilized by Zener diodes, not shown. In each threshold circuit the emitters of the two transistors are connected to a common emitter resistor. In the threshold circuit 3 this emitter resistor is designated with the reference numeral 11, whereas in the threshold circuit 4, this emitter resistor is the component 14. The two resistors 11 and 14 are, in turn, connected together to form a common junction to which ground potential is applied. The base of transistor $T_2$, which is the output transistor, leads to the resistor 9 connected in the collector circuit of the input transistor $T_1$. In a similar manner the base of transistor $T_4$ leads to the resistor 19 which lies in the collector circuit of transistor $T_3$, the input transistor for the threshold circuit 4. A resistor 8 is connected between the base of transistor $T_3$ and the voltage source 12. Correspondingly, a resistor 18 is connected to the base of transistor $T_1$ and the voltage source 13. As a result of these two resistors 8 and 18, the bases of each of the two input transistors $T_1$ and $T_3$ have applied to them a voltage which serves to reduce the DC voltage arising from noise effects. These oppositely-directed voltages applied to the bases of the input transistors $T_1$ and $T_3$ are scaled or of such values that the transistors are cut off when no antenna signal prevails or when there is no signal worthy of reception. When, under these conditions, the transistors are not entirely cut off, only a small collector current in the transistors will prevail.

The base of transistor $T_2$ leads to the voltage source 12 by way of the resistors 9 and 10. At the same time, the base of the transistor T leads to the voltage source 13 by way of the resistors 19 and 20. As a result of the values of the transistors connected to the bases of the two output transistors, the base potentials are made sufficiently high that both transistors, $T_2$ and $T_4$ are fully conducting. The voltage drops across the emitter resistors 11 and 14, thereby, support the cut off of the input transistors $T_1$ and $T_3$.

The collector current of transistor $T_2$ flows through the resistor 21 and the two lamps $L_1$ and $L_2$ connected in parallel. The collector current of the output transistor $T_4$ is of the same magnitude as the collector current of the output transistor $T_2$. The collector current of transistor $T_4$ flows through the resistor 22 and the two lamps $L_3$ and $L_4$ also connected in parallel. The two incandescent lamps $L_1$ and $L_3$ serve to illuminate two adjacent areas of a tuning indicator board which is made of three illuminated areas preferably arranged in an adjacent manner. The incandescent lamps $L_2$ and $L_4$ are associated with silent tuning to be described. As a result of the voltage drop across the collector resistors 21 and 22, the potential difference between the circuit junctions *x* and *y* is small. Accordingly, this potential difference between the circuit junctions *x* and *y* is not sufficient to permit sufficient current to flow through the lamp $L_5$, by way of the resistor 23, for the purpose of illuminating the center area of the indicator board.

When tuning the apparatus to the center of a carrier with sufficient field strength, both input transistors $T_1$ and $T_3$ are turned on. As a result, voltage drops appear across the collector resistors 9 and 19, which are sufficiently high that the output transistors $T_2$ and $T_4$ are turned off.

The turning off and turning on functions of the transistors are accomplished in a stepwise manner through the common emitter resistors 11 and 14. As a result of the diminishing collector currents of the transistors $T_2$ and $T_4$, the accompanying voltage difference between the circuit junctions *x* and *y* is increased. The necessary current for illuminating lamp $L_3$ can thereby flow through the resistor 23 for the purpose of illuminating the center area of the indicator board. Such illumination of the indicator board provides an indication that a reception-worthy signal is being transmitted.

With slight detuning, severe reduction results in the magnitudes of both of the DC voltages, as mentioned above. The input transistor controlled from these DC voltages, therefore, is turned off. In the commonly known manner, the output transistor is correspondingly turned on and allows thereby the corresponding side area of the indicator board to be illuminated in addition to the weakly illuminated center area. The other side area of the indicator board is, at the same time, maintained dark. When detuning is in the opposite direction, the indicating functions of the two side areas of the indicator board are interchanged. With a proper spatial arrangement of the illuminated areas for transmission tuning, the following reception conditions or characteristics may be clearly indicated:

1. No antenna signal or a signal which is not reception-worthy. (The two exterior or side areas of the indicator board are illuminated).
2. Tuning to the center of a carrier of a receptive signal. (Only the center area of the indicator board is illuminated).
3. Tuning to the left sideband. (The left area of the indicator board is illuminated).
4. Tuning to the right sideband. (The right area of the indicator board is illuminated).

An RC network consisting of the resistor 5 and capacitor 6 leads to the base of the input transistor $T_1$. Similarly, an RC network with resistor 15 and capacitor 16 leads to the base of the input transistor $T_3$. These RC networks are provided for the purpose of attenuating the low frequency signals superimposed upon the DC voltages. A limiting diode 7 is connected between the base of transistor $T_1$ and the junction of resistor 5 and capacitor 6. A similar limiting diode 17, but conducting in the opposite direction, is connected between the base of transistor $T_3$ and the junction of resistor 15 and capacitor 16.

The two lamps $L_2$ and $L_4$ connected in parallel with lamps $L_1$ and $L_3$, respectively, control the transistor $T_5$ through the effect of the photoresistor 26. The operation of these two lamps as a function of the transmission tuning, corresponds to the operation described above in relation to lamps $L_1$ and $L_3$ for purposes of illuminating specific areas of the indicator board. The interaction between the photoresistor 26 and lamps $L_2$ and $L_4$ is such that the resistor is switched from a high ohmic state to a low ohmic state as soon as at least one of the two lamps is lighted.

The photoresistor 26 is connected in a negative feedback circuit between the base and collector of the transistor $T_5$. Thus, one end of the photoresistor 26 leads to the collector of the transistor $T_5$ by way of the capacitor 37. The other end of the photoresistor 26 leads to the base of the transistor $T_5$ by way of the switch 27 and capacitor 44. Through this interconnection of the photoresistor 26 with the transistor $T_5$, a large voltage is generated which provides opposing coupling effects between the base and collector of the transistor, when the photoresistor is in the low-ohmic state resulting when the photoresistor is illuminated. This action results when the circuit is switched to silent tuning. When, on the other hand, the photoresistor is in the high-ohmic state occurring when the photoresistor is illuminated, or when the circuit is switched from the silent tuning, the photoresistor does not influence or apply any effects to the coupling action of the resistor 29. When the switch 27 is closed, the resistor 29 is connected directly in parallel with the photoresistor 26. The output voltage NF of the ratio detector is applied from the junction of the resistors 1 and 2, to the base of the transistor $T_5$, by way of the circuit path including capacitors 41 and 43, resistor 30, and capacitor 44.

When the switch 27 is closed, the circuit is switched to the silent tuning function. When under this condition the photoresistor 26 is illuminated, the amplification and input resistance of the NF stage including transistor $T_5$, are severely reduced. This reduction resulting from the severe oppositely-directed coupling due to the photoresistor effect, is such that the level of the output signal NF is approximately 60 db. lower. As described above, the photoresistor does not become illuminated only when there is tuning on a receptive transmission signal. Accordingly, only when the circuitry is switched to silent tuning, can the NF signal be transmitted further to the input of the following NF amplifier, by way of the capacitors 37, 38 and resistor 36. Through proper scaling and setting of the operating point of the threshold circuit, the response sensitivity may be made dependent upon the high-frequency RF level.

In order to switch the input transistor of the threshold circuit from the turned-on state to the turned-off state and, at the same time, switch the output transistor from the turned-on state into the turned-off state, a specific condition must prevail. This condition is that the base voltage of the input transistor must overcome the voltage drop at the emitter resistors 11 and 14 resulting from the additional collector current at the output transistor. At the same time, the base voltage of the input transistor can drop below this voltage requirements after the turning off of the output transistor, and before the input transistor is again turned off. This hysteresis-type of effect results from the common connection of the emitter resistors 11 and 14. As a result of this hysteresis effect the apparatus must be very precisely tuned to the transmitter for the transmitter indication on the center area of the indicator board, and for cutoff of the silent tuning stage. Under these conditions, then, level variations, small frequency deviations or tuning failures, within a specific "holding region," do not immediately give rise to silent tuning and to the illumination of the side areas of the indicator board. This "holding region" is scaled and selected so that for increased detuning, the side-band noise becomes securely suppressed through the silent tuning.

The threshold circuits 3 and 4 exhibit pure switching action. Furthermore, the photoresistor 26 varies its resistance value in a stepwise manner, and the operating point of the transistor $T_5$ is not varied through the coupling effect. As a result, no drift transitions and no attenuations can occur.

It will be understood that each of the elements described above, or two or more together, may also find a useful application in other types of tuning arrangements in high-frequency receivers differing from the types described above.

While the invention has been illustrated and described as embodied in a tuning arrangement in high-frequency receivers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

I claim:

1. An arrangement for combined tuning indication and silent tuning in a high-frequency receiver comprising, in combination, symmetrical detector means having an input and an output and providing DC voltages of opposite polarity; two threshold switching circuits with inputs connected to said DC voltages from said symmetrical detector means; first and second lamp means each connected to the output of respective one of said threshold switching circuits, said lamp means being the output impedances of said threshold switching circuits; third lamp means connected between said first and second lamp means so that said third lamp means is turned on and lighted when said first and second lamp means are turned off, said third lamp means being turned off when said first and second lamp means are turned on, whereby that one of said first and second lamp means are turned on when the DC voltage applied to the input of its threshold circuit is below a predetermined threshold level associated with said threshold circuit, both of said first and second lamp means are turned on when said DC voltages applied to the inputs of both of said threshold circuits are below the predetermined threshold levels for respective ones of said threshold circuits, that one of said first and second lamp means being turned off when the DC voltage applied to the input of its threshold circuit is above a predetermined threshold level associated with said threshold circuit, and both of said first and second lamp means being turned off when said DC voltages applied to the inputs of both of said threshold circuits are above the predetermined threshold levels of respective ones of said threshold circuits.

2. The arrangement for combined tuning indication and silent tuning in a high-frequency receiver as defined in claim 1 including complementary transistors in said threshold switching circuits, said DC voltages being applied to said complementary transistors.

3. The arrangement for combined tuning indication and silent tuning in a high-frequency receiver as defined in claim 1 wherein said first and second lamp means each comprises two lamps connected in parallel.

4. The arrangement for combined tuning indication and silent tuning in a high-frequency receiver as defined in claim 3 including resistor means connected in series with the parallel combination of said two lamps.

5. The arrangement for combined tuning indication and silent tuning in a high-frequency receiver as defined in claim 1 including resistor means connected in series with said third lamp means.

6. The arrangement for combined tuning indication and silent tuning in a high-frequency receiver as defined in claim 1 including indicator board means having three indicating areas arranged so that one area is a center area and the other two areas are side areas on opposite sides of the center area, said third lamp means being associated with said center area and said first and second lamp means being associated with said side areas.

7. The arrangement for combined tuning indication and silent tuning in a high-frequency receiver as defined in claim 1, including photoresistor means exposed to the light conditions of said first and second lamp means, the resistance value of said photoresistor means being extremely high when said first and second lamp means are turned off, and being extremely low when said first and second lamp means are turned on.

8. The arrangement for combined tuning indication and silent tuning in a high-frequency receiver as defined in claim 7, including audio amplifying circuit means having an input connected to said output of said symmetrical detector means, and an output, said audio amplifying circuit means having a negative feedback path between said input and output thereof, said photoresistor means being connected in said negative feedback path to control the gain of said audio amplifying circuit means so that the latter provides full gain only when said first and second lamp means are turned off and said third lamp means is turned on.

9. The arrangement for combined tuning indication and silent tuning in a high-frequency receiver as defined in claim 2, including respective audio frequency voltage dividers comprising each resistor-capacitance network means connected to the input of each said complementary transistors.

10. The arrangement for combined tuning indication and silent tuning in a high-frequency receiver as defined in claim 9, wherein each of said resistor-capacitance network means has a common junction, and including diode means connected between said common junction of each of said resistor-capacitance network means and the input of respective ones of said complementary transistors for raising the DC signal voltage level with respect to the noise voltage level.